US012112161B1

(12) United States Patent
Godse

(10) Patent No.: US 12,112,161 B1
(45) Date of Patent: Oct. 8, 2024

(54) SYSTEMS AND METHODS FOR MANAGING AND TRACKING CUSTOMIZATIONS

(71) Applicant: United Services Automobile Association (USAA), San Antonio, TX (US)

(72) Inventor: Hrishikesh Madhukar Godse, Prosper, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/729,792

(22) Filed: Apr. 26, 2022

(51) Int. Cl.
 *G06F 9/44* (2018.01)
 *G06F 8/20* (2018.01)
 *G06F 8/71* (2018.01)

(52) U.S. Cl.
 CPC . *G06F 8/71* (2013.01); *G06F 8/20* (2013.01)

(58) Field of Classification Search
 None
 See application file for complete search history.

(56) References Cited

U.S. PATENT DOCUMENTS

| 9,110,770 | B1* | 8/2015 | Raju | G06F 8/10 |
| 9,355,009 | B2* | 5/2016 | Chen | G06F 11/3433 |
| 9,811,439 | B1* | 11/2017 | Barrett | G06F 11/3612 |
| 10,425,295 | B1* | 9/2019 | Hazen | G06Q 10/0631 |
| 2019/0235984 | A1* | 8/2019 | Mathur | G06F 11/3438 |
| 2021/0081298 | A1* | 3/2021 | Gardner | G06F 11/3419 |
| 2021/0255853 | A1* | 8/2021 | Zhou | G06F 8/75 |

* cited by examiner

*Primary Examiner* — Ted T. Vo
*Assistant Examiner* — Lanny N Ung
(74) *Attorney, Agent, or Firm* — Fletcher Yoder, PC

(57) ABSTRACT

A system includes a rules engine comprising a template indicative of an initial source code of a core computing system, a processor, and memory storing instructions. The instructions are configured to cause the processor to retrieve data indicative of a current source code for the core computing system, and compare the data indicative of the current source code to the template indicative of the initial source code of the core computing system. The processor may then identify one or more customizations in the current source code of the core computing system based on comparing the data to the template and quantify an amount of customization applied to the core computing system based on identifying the one or more customizations.

20 Claims, 7 Drawing Sheets

SYSTEMS AND METHODS FOR MANAGING AND TRACKING CUSTOMIZATIONS

BACKGROUND

Many organizations, regardless of size, rely upon access to data and services for their continued operation and success. A respective organization may have associated hardware resources (e.g., computing devices, load balancers, firewalls, servers, etc.), software resources (e.g., database applications, custom applications, and so forth), and further may rely on various core systems provided by vendors that enable the organization to provide a variety of services to their customers. The core systems may be modified by the organization by applying customizations to aspects of the core system, thereby enabling the organization to tailor the core systems to fit the needs of their customers. Traditionally, organizations may manually manage (e.g., via an agent, manager, administrator, Governance Team, etc.) the customizations applied to the core systems. As an increasing number of customizations are applied to the core systems, an administrator tasked with managing the customizations may find it difficult to maintain an accurate record of each of the customizations, which can ultimately lead to detrimental effects on performance, maintainability, and upgradability of the core system. Further, an increasing number of customizations may make the core system vulnerable to compliance risks. Regulators also advise organizations against customizing industry standard core systems.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system comprises a rules engine defining a template indicative of an initial source code of a core computing system, a processor, and a memory storing instructions that cause the processor to retrieve data associated with the core computing system, wherein the data is indicative of a current source code for the core computing system. The instructions further cause the processor to compare the data indicative of the current source code for the core computing system to the template indicative of the initial source code of the core computing system, and identify one or more customizations in the current source code of the core computing system based on comparing the data to the template. The instructions further cause the processor to quantify an amount of customization applied to the core computing system based on identifying the one or more customizations.

In another embodiment, a non-transitory, computer-readable medium comprising may include computer-executable instructions that, when executed, are configured to cause a processor to retrieve data associated with a core computing system, wherein the data corresponds to a current source code for the core computing system, and wherein the core computing system includes one or more attributes configured to enable the core computing system to provide one or more services to a client. The processor is further configured to retrieve a template corresponding to an initial source code of the core computing system from a rules engine and compare the data corresponding to the current source code of the core computing system to the template corresponding to the initial source code of the core computing system. The processor is further configured to identify one or more customizations applied to the current source code based on one or more differences between the data and the template, wherein the one or more differences correspond to the one or more customizations, and quantify an amount of customization applied to the core computing system based on identifying the one or more customizations.

In another embodiment, a method may perform various operations via a processor, including retrieving data associated with a core computing system, the data being indicative of a current source code of the core computing system, and retrieving a template from a rules engine, the template being indicative of an initial source code of the core computing system. The method may further include comparing the data indicative of the current source code to the template indicative of the initial source code and identifying one or more customizations applied to the core computing system based on one or more differences between the data and the template, the one or more differences corresponding to the one or more customizations. The method may further include generating output indicative of a plurality of processing times associated with a plurality of portions of the current source code, identifying an issue in at least one portion of the plurality of portions of the current source code based on a respective processing time associated with the at least one portion exceeding a threshold value indicative of an acceptable processing time associated with the at least one portion of the current source code, and determining whether the issue in the at least one portion of the current source code is associated with the one or more customizations.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and context of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
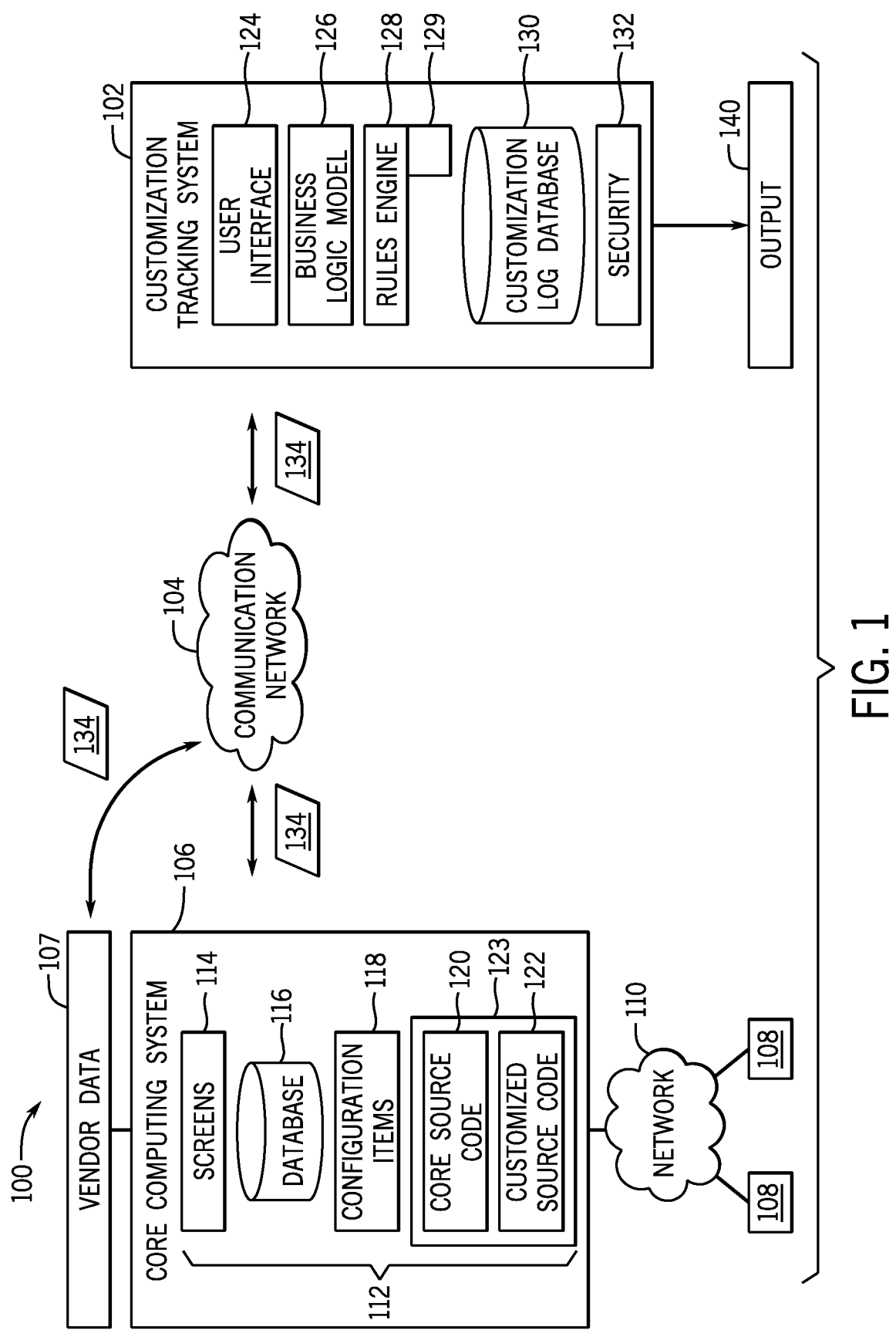
FIG. 1 illustrates a block diagram of an embodiment of a customization tracking system for managing customizations applied to a core system, in accordance with embodiments described herein.

The present disclosure relates generally to systems and methods that facilitate managing and tracking customizations applied to a core computing system. More specifically, the present disclosure relates to systems and methods for providing organizations the ability to dynamically track customizations (e.g., customization data) and analyze the customizations applied to core computing systems to limit compliance risks and improve performance. Specifically, embodiments of the present disclosure facilitate comparison of a baseline or core computing system structure with a modified computing system structure to identify modifications. For example, proportional modification may be tracked and/or limited depending on an amount of modification and/or operational testing of modifications (e.g., coding errors may block or further limit modification). Once added, modifications may be classified based on characteristics (e.g., function, programming language, location in a program execution, size, associated processing time). Further, the modifications may be tested separately and/or in conjunction with the core computing system (e.g., code) to identify errors, processing requirements, and the like. Thus, embodiments of the present disclosure facilitate troubleshooting to identify whether modifications or the core program are to blame for undesired issues (e.g., delayed operations, output errors, non-compliance). The core code and modified code can remain separate for analysis and troubleshooting. However, upon confirmation of operation for its intended purpose, a modification can be combined into the core code (or core computing system) so that future modifications can be added and tested against the combination. In some embodiments, multiple historical core computing systems (e.g., core code templates) may be maintained for testing purposes. In fact, different branches of modifications may be maintained and compared to identify preferred operational embodiments. It should be noted that testing of separate modifications or combined core operations and modifications may include code testing (e.g., testing for coding errors) and functional testing (e.g., testing for compliance with rules or testing for accurate results).

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an exemplary embodiment," or "an embodiment" of the present disclosure are not intended to be interpreted as excluding the existence of additional embodiments that also incorporate the recited features.

The present disclosure relates generally to managing and tracking customizations applied to one or more core computing systems that provide services for an organization. More specifically, the present disclosure relates to an automated system that receives data associated with a current source code of a core computing system and compares the data to a template defining an initial source code for the core computing system to identify differences between the template and the current source code. The differences may be indicative of one or more customizations applied to the core computing system by a representative (e.g., programmer) of the organization, thereby enabling a manager or administrator of the core computing system to track and monitor the one or more customizations as they are applied to aspects of the core computing system. Further, by monitoring and tracking the one or more customizations, the template indicative of the core system computer code may be updated into an updated base source code that incorporates one or more of identified customizations as core system computer code, thereby mitigating compliance risk, and improving upgradability, maintainability, and performance of the core computing system.

An increasing number of organizations are employing core computing systems supplied by vendors to provide various services to their customers based on their customer's needs. Core computing systems are collections or aggregations of products, which are designed by a vendor to operate as a functional entity in accordance with applicable specifications. For example, a bank may employ a core computing system to provide customers with access to daily banking transactions, updates to accounts, deposit, loan, and credit processing capabilities, and other financial records. The vendor associated with the banking core computing system may specify core computing system code for various aspects of the banking core computing system that enable the banking core computing system to provide the various services to customers of the organization. In some cases, vendors may grant organizations flexibility by enabling the organizations to customize various aspects of the core computing system to tailor the core system to a customer's specific needs. Traditionally, a representative of the organization may be tasked with manually maintaining and tracking customizations applied to various core systems offered by the organization. While the customizations may provide certain benefits to customers of the organization, an increasing amount of customization applied to a respective core computing system may increase the difficulty in maintaining accurate records of the customizations, and further may have a negative effect on performance, maintainability, and upgradability of the core system. It should be noted that the present disclosure references vendors as an example of a computing system (e.g., software application) provider.

However, while vendors are one type of computing system provider, other providers may be internal to an organization (e.g., a department of an organization that employs the provided computing system) and not what would typically be considered a vendor. Accordingly, it should be understood that where the term vendor is used in this document it is one example of various types of potential providers, such as an internal department.

With this in mind, the advent of systems and methods that may automatically track and monitor customizations applied to various core computing systems employed by an organization has made tracking and maintaining accurate records of customization more feasible. It is now recognized that various advantages may be gained with automated customization tracking systems that interact with core computing systems to identify customizations applied to various aspects of the core computing systems, thereby improving an organization's ability to maintain accurate records of the various customizations applied across the core computing systems employed by the organization. By maintaining accurate records of the various customizations applied, an organization's ability to upgrade the core computing system may also be improved. Further, detailed metrics and reports may be generated by the customization tracking system that provide information associated with the customizations (e.g., amounts of customization, types of customization, run times associated with customized aspects of core systems, individuals that implemented the customization, specific skills required to implement the customization, and the like), such that a representative of the organization may determine whether issues experienced by the core system are a product of the customizations, and/or may assign an appropriate individual with the proper credentials (e.g., specific coding skills associated with the customizations) to address the issues. The metrics and reports may also be utilized by auditors tasked with assessing whether the core computing systems are within certain compliance thresholds, thereby decreasing an amount of time associated with an audit process.

Further still, automated customization tracking systems may enable organizations to maintain an amount of customization within specified compliance thresholds. That is, while vendors may enable organizations to customize certain aspects of the vendor's core computing system, the vendor may also prescribe certain threshold values indicative of acceptable amounts of customization to the various aspects of the core computing system. Detected customization levels that exceed the prescribed threshold values are indicative of core computing systems that have been customized to a point of non-compliance with the vendor's specifications, which can ultimately have a negative effect on performance. Thus, as an increasing number of customizations are applied to the core computing system, alerts and notifications may be generated by the customization tracking system to notify a representative of the organization that the amount of customization is approaching a compliance threshold, thereby enabling the organization to mitigate compliance risks. Additionally, upon approaching certain compliance thresholds, the organization may send a request to the vendor to update the core computing system to incorporate certain customizations as part of the core computing system code, thereby further enabling the organization to mitigate compliance risks and improve the upgradability of the core computing system.

By way of introduction, FIG. 1 illustrates a schematic block diagram of a system 100 including a customization tracking system 102 that utilizes an exemplary communications network 104 to receive data associated with a core computing system 106. It is to be understood that the communication network 104 is a geographically distributed collection of nodes interconnected by communication links and segments for transporting data between the core computing system 106 and the customization tracking system 102. Many types of networks are available, with the types ranging from local area networks (LANs) to wide area networks (WANs). LANs typically connect the nodes over dedicated private communications links located in the same general physical location, such as an insured property. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC), and others.

As illustrated in FIG. 1, the customization tracking system 102 receives data associated with the core computing system 106 via the communication network 104. In some embodiments, the customization tracking system 102 may be any suitable computing or server device, and using data sources available to the customization tracking system 102 (e.g., core computing system 106, aspects of the core computing system 106, vendor data 107), the customization tracking system 102 may receive data associated with one or more customizations applied to one or more aspects of the core computing system 106, thereby enabling the customization tracking system 102 to maintain current, accurate records of customizations applied to the core computing system 106. For the purposes of this disclosure, a "core computing system" may refer to a collection or aggregation of products (e.g., applications) which are designed (e.g., by a vendor or application design department) to be employed by an organization to provide a number of services (e.g., order services, fee services, pricing services, product services) to the organization's customers. Further, the vendor data 107 may include data associated with each of the core computing systems 106 coupled to the customization tracking system 102. That is, the vendor data 107 may include operating manuals, policy guidelines, compliance guidelines, vendor specifications, and the like, which are prepared by the vendor and define certain aspects of the core computing system 106. Using the vendor data 107, the customization tracking system 102 may be made aware of a manner in which customizations should be applied (e.g., customizing in a specific coding language) and/or an amount of customization that can be applied to one or more aspects of the core computing system 106 while maintaining compliance with the policies and guidelines outlined by the vendor. The core computing system 106 may include computing systems capable of providing functionality and/or services via an application program, web-page, or the like, to a customer of the organization. For example, a client 108 may communicate with the core computing system 106 via a network 110 to access various applications and services provided by the core computing system 106. In other embodiments, the client 108 may communicate with the core computing system 106 via the communication network 104. The client 108 may include any suitable computing system and may also include client application programs that run on the respective computing system and are configured to operate with the core computing system 106 to provide services to the client 108. Although only a single core computing system 106 is shown connected to the customization tracking system 102, it should be noted that the customization tracking system 102 may connect to multiple core computing systems 106 to provide various services to clients 108 of the organization.

Through the communication network 104, the customization tracking system 102 may connect to one or more core computing systems 106 running a number of different application programs. Each of the core computing systems 106 may include any computing system capable of providing functionality from an application program to the client 108. Each of the core computing systems 106 may include hardware, software, and one or more application nodes, that may enable an organization to provide a number of services including, but not limited to, bank mortgage services, communication services, retail services, customer services, work order management services, information technology (IT) services, web-interfaces, and the like, to clients 108 of the organization. To facilitate the provision of these services, the core computing system 106 may include one or more attributes 112. The one or more attributes 112 may be configured to enable the client 108 to interact with the core computing system 106, and/or may be configured to perform various functions to provide services of the core computing system 106 to the client 108. For example, the one or more attributes 112 may include screens 114, databases 116, and configuration items 118 configured to provide services of the core computing system 106 to the client 108. Additionally, the core computing system 106 may be associated with a core source code 120 and/or a customization source code 122 comprising a collection of code written in a human-readable programming language that may be compiled or assembled into an executable computer program that defines the functions or operations of the attributes 112 and/or provides the services of the core computing system 106 to the client 108.

The screens 114 may be configured to provide a graphical user interface for the client 108 of the organization such that the client 108 can maneuver through the core computing system 106 to access the services provided by the core computing system 106. The databases 116 may contain a series of tables having information about assets and services provided by the core computing system 106. For example, the databases 116 may store information about assets and services such as configuration items (CI's) 118. The CIs 118 may include hardware resources, software resources, virtual resources, and/or storage constructs. For example, the CIs 118 may include printers, routers/switches, load balancers, virtual systems, storage devices, and/or other connected devices that facilitate the provision of services to the client 108.

As noted above, the core source code 120 may be a collection of code written in a human-readable programming language, and is designed to facilitate the work of computer programmers tasked with specifying actions to be performed by a core computing system 106. That is, the core source code 120 may be generated by a programmer associated with the vendor (and outlined in the vendor data 107) and may specify a listing of human-readable programming statements to be compiled or assembled into an executable computer program that may perform functions and provide services to the client 108. The core source code 120 may dictate how various aspects of the core computing system 106 function to provide services to the client 108. That is, respective portions of the core source code 120 may be associated with the operation and/or configuration of the one or more attributes 112 of the core computing system 106. For instance, the core source code 120 may define a manner in which the screens 114 are configured to display information associated with the core computing system 106. Further, respective portions of the core source code 120 may be associated with different services that the core computing system provides. For example, in the context of a core banking computing system, each of the services provided (e.g., daily banking transactions, updates to accounts, deposit, mortgage loan originations, credit processing capabilities, access to financial records) may be associated with respective portions of the core source code 120.

The customization source code 122 may be indicative of one or more additional customizations applied to the core computing system 106. That is, a representative (e.g., programmer) of the organization may include additional source code independent of the core source code 120. The customization source code 122 may specify additional human-readable programming statements that may be assembled into an executable computer program to be used with the core source code 120 to provide additional functions and/or services to the client 108. Collectively, the core source code 120 and the customization source code 122 may correspond to a current source code 123 of the core computing system 106 that defines the operation and/or configuration of the one or more attributes 112 of the core computing system 106, thereby enabling the core computing system 106 to provide a variety of customized functions and services to the client 108.

The customization tracking system 102 may include a user interface 124, a business logic model 126, a rules engine 128 and a customization log database 130. The user interface 124 may enable a representative of the organization (e.g., software developer, IT personnel) to interact with the customization tracking system 102 to analyze the received data from the core computing system 106. That is, the user interface 124 may enable the representative to maneuver through the customization tracking system 102 and apply changes to one or more aspects of the customization tracking system 102 (e.g., changes to the business logic model, changes to the rules engine). For example, the representative may utilize the user interface 124 to update the rules engine 128 to include a new set of rules (e.g., a new template) that dictate a manner in which the customization tracking system 102 should operate, as described in greater detail below.

The business logic model 126 may include a number of thresholds (e.g., limits) provided by a vendor of the core computing system 106 (e.g., via vendor data 107) or by a representative of the organization. The threshold values may be associated with permissible amounts of customization that may be applied to respective portions of the current source code 123 (e.g., core source code 120 and customized source code 122) associated with each the one or more attributes 112 of the core computing system 106. That is, vendors may specify that the current source code 123 (or portions thereof associated with the one or more attributes 112) of the core computing system 106 may be modified or customized a specified amount while maintaining compliance with the vendor's specifications (e.g., regulatory compliance controls) for the core computing system 106. For example, the business logic model 126 may include a first threshold value (e.g., less than 5%) specified by the vendor (e.g., from vendor data 107) that corresponds to an acceptable (e.g., desired) total amount of customization applied to the core computing system 106 (i.e., sum of customization applied to the current source code 123 of the core computing system 106). Further, in some embodiments, the business logic model 126 may include additional threshold values corresponding to acceptable amounts of customization for each of the portions of the current source code 123 associated with the one or more attributes 112 of the core computing system 106. For example, the vendor may specify that a portion of the current source code 123 associated with the screens 114 of the core computing system 106 may be customized up to 15%, while a portion of the current source code 123 associated with the configuration items 118 may only be customized up to 5% before exceeding specified customization thresholds. In some embodiments, other thresholds (e.g., limits) may be introduced based on error detection. For example, upon performing a test on the current source code 123, the customization tracking system 102 may identify one or more errors in the current source code 123. The one or more errors may be associated with customized aspects of the core computing system 106, and the business logic model 126 may apply lower thresholds (e.g., 0%) based on the detection of the one or more errors. As the amount of customization associated with a particular attribute 112 (e.g., the amount of customization associated with a particular portion of the current source code 123 associated with the particular attribute 112) approaches and/or exceeds the specified threshold value, the organization increases a risk of being non-complaint with the vendor's specifications, which can negatively affect performance, upgradability, and maintainability of the core computing system 106. Further, customizations beyond applicable thresholds to the regulatory compliance controls of the core computing system 106 can lead to regulatory risks. As noted above, though vendors may specify the thresholds used in the business logic model 126, in some embodiments, a representative of the organization may modify these threshold values or add new threshold values to mitigate compliance risks. For example, if a vendor has established a total customization threshold for the current source code 123 of the core computing system 106 at 5%, the representative may set a modified threshold at 4%, such that as the amount of customization to the current source code 123 approaches the modified threshold, a representative may be alerted of the increasing amount of customization. In turn, the customization tracking system 102 may initiate actions to limit or decrease customization before the amount of customization exceeds the threshold specified by the vendor, as described in greater detail below.

The rules engine 128 may include a number of rules and protocols that facilitate the customization tracking system 102 in identifying the customizations applied to the core computing system 106. For example, the rules engine 128 may include a template 129 (e.g., initial template) that defines an initial source code for the core computing system 106 (i.e., source code before customizations are applied). In some embodiments, the customization tracking system 102 may retrieve the template 129 from the vendor data 107. As vendors apply updates to the initial source code, the customization tracking system 102 may dynamically retrieve the updates such that the rules engine 128 may update the template 129 to reflect the updated source code. The initial source code may have aspects (e.g., portions, segments) associated with each of the one or more attributes 112 of the core computing system 106 that provide instructions and/or commands to facilitate or guide operation of the attributes 112. For example, a first portion of the initial source code may correspond to instructions associated with operating the screen 114, while a second portion of the initial source code may correspond to instructions associated with operating the configuration items 118. Indeed, it should be noted that prior to applying any customizations to the core computing system 106, the template 129 defining the initial source code may correspond to the core source code 120 present within the core computing system 106. However, as the core computing system 106 is customized to fit the needs of clients 108, the current source code 123 may begin to differ from the initial source code defined by the template 129.

The customizations log database 130 may include a series of tables or logs that store information associated with one or more customizations applied to the core computing system 106 and detected by the customization tracking system 102. That is, as customizations are applied to the core computing system 106 and identified by the customization tracking system 102, the customization log database 130 may store information associated with each of the identified customizations. For example, the customization log database 130 may store information associated with a time the customization was entered, an individual responsible for implementing the customization, specific programming skills needed to manage the customization, initial source code modified by the customization, processing times associated with the segment of code that contains the customization, and the like. Using the data collected and stored in the customization log database 130, the customization tracking system 102 may generate output 140 including metrics, reports, alerts, and notifications, as described in greater detail below. The customization tracking system 102 may also include security features 132 configured to limit access to the customization tracking system 102 by unauthorized users. For example, the security features 132 may include firewalls and/or authentication procedures (e.g., user name and password authentication, voice recognition, biometrics) that provide authorized users access to the customization tracking system 102 and the information generated by the customization tracking system 102.

As illustrated in FIG. 1, the core computing system 106 may communicate data packets 134 (or frames) to the customization tracking system 102 using predefined network communication protocols as will be appreciated by those skilled in the art, such as various wired protocols and wireless protocols, etc., where appropriate. In this context, a protocol consists of a set of rules defining a manner in which the customization tracking system 102 and the core computing system 106 interact with one another. For example, the protocol may include a data batch process sent from the customization tracking system 102 that periodically queries the core computing system 106 for data associated with the current source code 123 of the core computing system 106. In some embodiments, the protocol may instruct the customization tracking system 102 to extract data associated with the current source code 123 via application programming interfaces (API's) that are configured to retrieve the data according to a data capture frequency value (e.g., every 60 seconds, every 5 minutes, every hour). In some embodiments, upon determining that a customization level associated with at least one of the attributes 112 is approaching a certain threshold value or a total customization level of the core computing system 106 is approaching a total customization threshold value, the customization tracking system 102 may modify the data capture frequency value such that the customization tracking system 102 receives data associated with customizations at an increased frequency (e.g., every 5 seconds, every 30 seconds). In doing so, the customization tracking system 102 may decrease a likelihood of a customization threshold being violated, thereby increasing compliance, upgradability, and maintainability of the core computing system 106.

The retrieved data associated with the current source code 123 and/or the attributes 112 of the core computing system 106 may then be parsed, processed, and analyzed by the customization tracking system 102 to identify one or more customizations applied to the core computing system 106, as described in greater detail below. The customization tracking system 102 may store the identified customizations in the customization log database 130 for subsequent analysis. As noted above, the customization tracking system 102 may monitor a total amount of customization applied to the core computing system 106 and/or may monitor an amount of customization applied to respective portions of the current source code 123 associated with each of the one or more attributes 112 of the core computing system 106.

As noted above, in some embodiments, the customization tracking system 102 may generate output 140 associated with the identified customizations. For example, the output 140 generated by the customization tracking system 102 may include dashboards, detailed metrics, and reports that provide summaries and statistics associated with the customizations. Further, the detailed metrics and reports may provide specific details associated with the customizations including times of implementation, agents responsible for implementation, specific coding skills required for implementation, processing speeds associated with customized aspects of the core computing system 106, and the like. Indeed, the output 140 generated by the customization tracking system 102 may provide insight on customized aspects of the core computing system 106, thereby enabling an organization to determine whether certain customizations should be removed (e.g., particular customization is slowing performance), whether specific programming skills are required to address an issue associated with the customization, and/or whether the core computing system 106 should be updated to incorporate portions of the customizations as core system computing code, as described in greater detail below. Further still, in some embodiments, the output 140 may include alerts or notifications. For example, as noted above, the customization tracking system 102 may be configured to monitor an amount of customization applied to the core computing system 106, and in some embodiments, may be configured to monitor an amount of customization applied to respective portions of the current source code 123 corresponding to each of the one or more attributes 112 of the core computing system 106. Upon determining that the amount of customization applied to the core computing system 106 and/or a respective amount of customization to at least one of the one or more attributes 112 exceeds specified threshold values, the customization tracking system 102 may generate output 140 such as an alert or notification to notify a representative of the organization that the core computing system 106 or an attribute 112 of the core computing system 106 is approaching specified customization compliance thresholds. The various types of output 140 generated by the customization tracking system 102 will be discussed in detail with respect to FIG. 5 below.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Further, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be any tangible computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless devices, wireline, optical fiber cable, RF, etc., or any suitable combination of the foregoing.

Computer program code for carrying out operations for aspects of the present disclosure may be written in any combination of one or more programming languages, including, but not limited to, an object oriented programming language such as Java, Smalltalk, C++ or the like and conventional procedural programming languages, such as the "C++" programming language or similar programming languages. For example, the customization tracking system 102 and the current source code 123 may include portions written in Java, while other portions are written in C++. Further, the customizations applied to the one or more attributes 112 of the core computing systems 106 may also be written in any combination of the one or more programming languages, and as such, specific coding skills may be required by an agent to address issues associated with the customizations. The program code may execute entirely on the agent's computer, partly on the agent's computer, as a stand-alone software package, partly on the agent's computer and partly on a remote computer or entirely on the remote computer or server. In the latter scenario, the remote computer may be connected to the agent's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
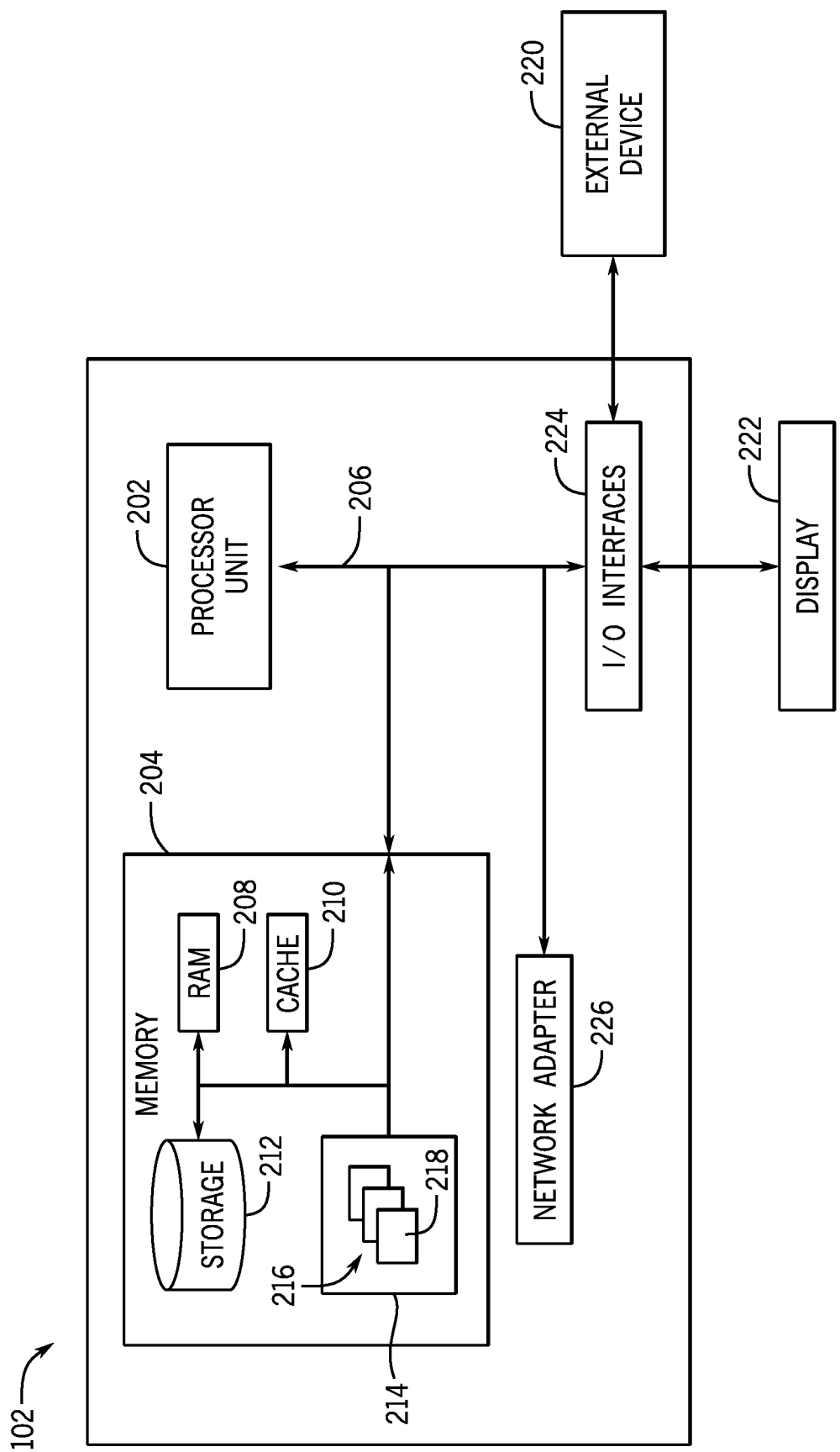
FIG. 2 illustrates a block diagram of an embodiment of a computing device that may be part of the customization tracking system of FIG. 1, in accordance with embodiments described herein.

FIG. 2 is a schematic block diagram of an embodiment of the customization tracking system 102 of FIG. 1 that may be used (or components thereof) with one or more embodiments described herein. As explained above, various core computing systems 106 may be configured to communicate data associated with various aspects (e.g., attributes 112) of the core computing system 106 to the customization tracking system 102 via the communication network 104, thereby enabling the customization tracking system 102 to analyze the data and identify customizations applied to the core computing system 106. The customization tracking system 102 is only one example of a suitable system and is not intended to suggest any limitation as to the scope of use or functionality of embodiments of the present disclosure. That is, in some embodiments, the methods discussed herein may be performed by any suitable computing device. Regardless, the customization tracking system 102 is capable of implementing and/or performing any of the functionality set forth herein.

The customization tracking system 102 is operational with and/or may include numerous other general purpose or special purpose computing system environments or configurations. Examples of well-known computing systems, environments, and/or configurations that may be suitable for use with or incorporated with the customization tracking system 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, cloud based systems, and distributed data processing environments that include any of the above systems or devices, and the like.

The customization tracking system 102 may be described in the general context of computer-executable instructions, such as program modules, being executed by a computer system. Generally, program modules may include routines, programs, objects, components, logic, data structures, and so on that perform particular tasks or implement particular abstract data types, and may be practiced in distributed data processing environments where tasks are performed by remote processing devices that are linked through a communications network. In a distributed data processing environment, program modules may be located in both local and remote computer system storage media including memory storage devices.

The customization tracking system 102 is shown in FIG. 2 in the form of a general-purpose computing device. The components of the customization tracking system 102 may include, but are not limited to, one or more processors or processing units 202, a system memory 204, and a bus 206 that couples various system components including the system memory 204 to the one or more processors 202.

Bus 206 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The customization tracking system 102 typically includes a variety of computer system readable media. Such media may be any available media that is accessible by the customization tracking system 102, and it includes both volatile and non-volatile media, removable and non-removable media. The system memory 204 can include computer system readable media in the form of volatile memory, such as random access memory (RAM) 208 and/or cache memory 210. The customization tracking system 102 may further include other removable/non-removable, volatile/non-volatile computer system storage media. By way of example only, a storage system 212 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 206 by one or more data media interfaces. As will be further depicted and described below, the system memory 204 may include at least one program product having a set (e.g., at least one) of program modules that are configured to carry out the functions of embodiments of the disclosure.

For example, program/utility 214, having a set (at least one) of program modules 216, such as a customization analysis module 218 may be stored in the memory 204 (by way of example, and not limitation), as well as an operating system, one or more application programs, other program modules, and program data. Each of the operating system, one or more application programs, other program modules, and program data or some combination thereof, may include an implementation of a networking environment. The program modules 216 generally carry out the functions and/or methodologies of embodiments of the disclosure as described herein. For example, using the business logic model 126 and the rules engine 128 of FIG. 1, the customization analysis module 218 may analyze the retrieved data corresponding to the current source code 123 of the core computing system 106 to identify customizations that have been applied to the core computing system 106. In turn, the customization analysis module 218 may generate the output 140 that provides information associated with the customizations, as described in greater detail below.

The customization tracking system 102 may also communicate with one or more external devices 220 such as a keyboard, a pointing device, a display 222, and the like. The display 222 may correspond to the user interface 124 of FIG. 1. The customization tracking system 102 may also include any devices (e.g., network card, modem, etc.) that enable the customization tracking system 102 to communicate with one or more other computing devices. Such communication can occur via Input/Output (I/O) interfaces 224. Still further, the customization tracking system 102 can communicate with one or more networks such as a local area network (LAN), a general wide area network (WAN), and/or a public network (e.g., the Internet) via a network adapter 226. As depicted, the network adapter 226 communicates with the other components of the customization tracking system 102 via the bus 206. It should be understood that although not shown, other hardware and/or software components could be used in conjunction with the customization tracking system 102. Examples, include, but are not limited to: microcode, device drivers, redundant processing units, external disk drive arrays, RAID systems, tape drives, and data archival storage systems, and the like.

FIGS. 1 and 2 are intended to provide a brief, general description of an illustrative and/or suitable exemplary environment in which embodiments of the present disclosure may be implemented. FIGS. 1 and 2 are not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
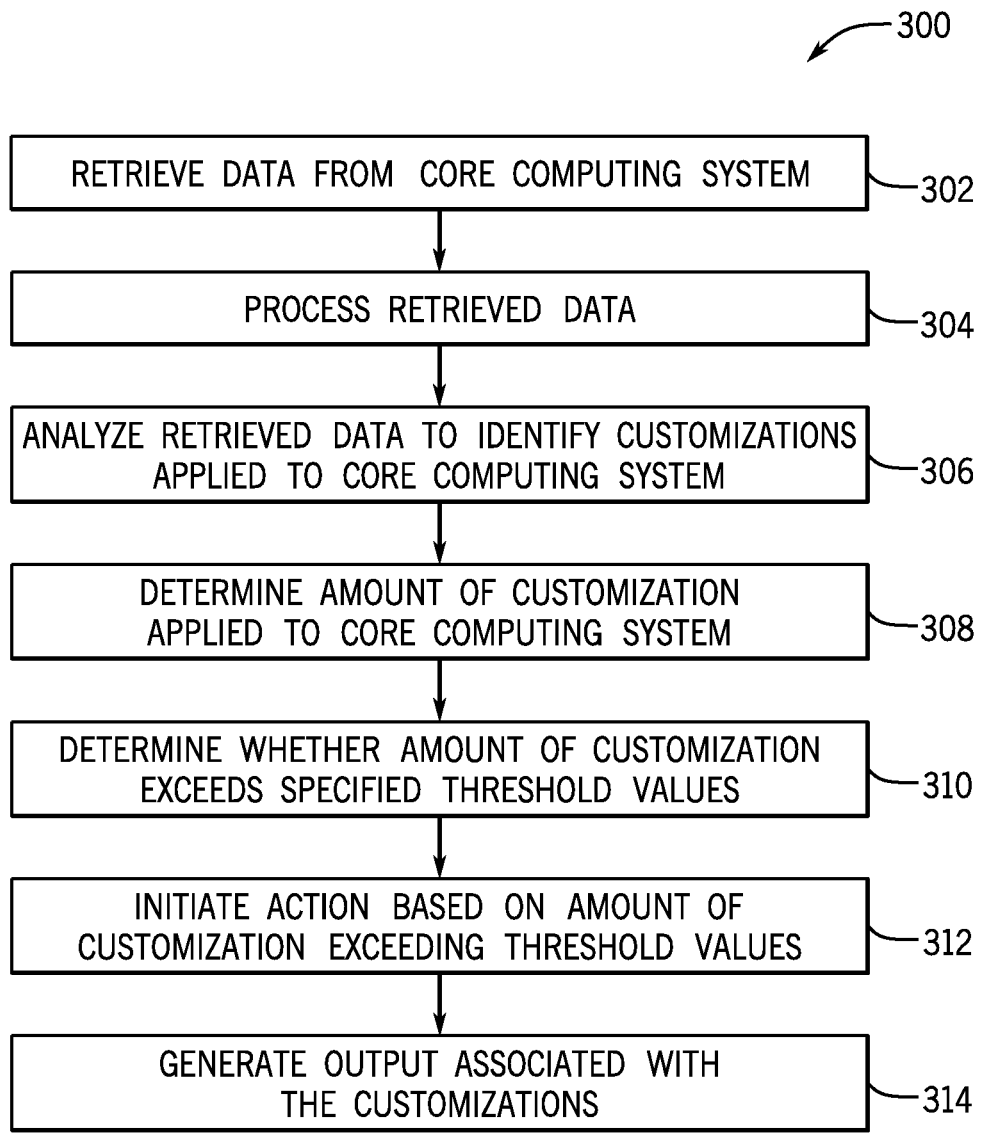
FIG. 3 illustrates a flow diagram of an embodiment of a method for tracking customization data associated with a core computing system, in accordance with embodiments described herein.

With the foregoing in mind, FIG. 3 illustrates a flow chart of a method 300 employed by the customization tracking system 102 for identifying customizations applied to aspects (e.g., current source code 123, attributes 112) of a core computing system 106. Although the following description of the method 300 is described in a particular order, it should be noted that the method 300 is not limited to the depicted order; and instead, the method 300 may be performed in any suitable order. In addition, although the customization tracking system 102 is described as performing the method 300, it should be understood that the method 300 may be performed by any suitable computing device.

Referring now to FIG. 3, at block 302, the customization tracking system 102 preferably retrieves data from one or more core computing systems 106 configured to provide a number of services to customers of an organization. The data retrieved by the customization tracking system 102 may correspond to the current source code 123 (e.g., core source code 120 and/or customized source code 122) of a respective core computing system 106, and may be associated with one or more customizations applied to the core computing system 106. As noted above, the customization tracking system 102 may be configured to periodically capture or retrieve the data utilizing a data extract batch process. For example, the data extract batch process may include instructions to query the one or more core computing systems 106 at prescribed time intervals (e.g., every minute, hour, day) for data associated with the current source code 123 of each of the various core computing systems 106. In some embodiments, at block 302, the customization tracking system 102 may retrieve the data according to a data capture frequency value, and may send the data (via network 104) to the customization tracking system 102. In other embodiments, job scheduling and/or workload automation systems may also be used to schedule retrieval for customization related data from the core computing system 106. Further, in some embodiments, an agent responsible for implementing a change (e.g., customization) to the core computing system 106 may communicate the change to the customization tracking system 102. For example, an agent responsible for customizing an attribute 112 of a core computing system 106 (by modifying the core source code 120 or adding customized source code 122) may provide an indication to the customization tracking system 102 that a customization has been applied. It is to be understood that the data retrieved by the customization tracking system 102 (e.g., via the data extract batch process, via direct input from an agent) may be aggregated into data packets (e.g., data packets 134 of FIG. 1), and may be sent to the customization tracking system 102 for subsequent analysis.

At block 304, the customization tracking system 102 processes the retrieved and/or received data corresponding to the current source code 123 for the core computing system 106. For example, the customization tracking system 102 may include a parser configured to parse the data packets 134 retrieved by the customization tracking system 102, and classify the data based on, for example, a time that the current source code 123 is collected, a computer programming language of a respective portion of the current source code 123, one or more attributes 112 associated with a respective portion of the current source code 123, one or more services associated with a respective portion of the current source code 123, and the like. In some embodiments, the customization tracking system 102 may further create a data structure for each classification and/or may employ machine learning models housed and stored in the program modules 216, the processor 202, and/or a network to process the retrieved data. The machine learning models may be used to leverage higher computing capacity, and may facilitate identifying customizations applied to the core computing systems. In some embodiments, the machine learning models may be used to identify the effects certain customizations have on the core computing system's performance, as described in greater detail below.

At block 306, the customization tracking system 102 (e.g., via customization analysis module 218) may conduct an analysis on the retrieved data to identify one or more customizations applied to the core computing system 106. For example, the customization tracking system 102 may compare the retrieved data corresponding to the current source code 123 (e.g., core source code 120 and customized source code 122) of the core computing system 106 with the one or more protocols (i.e., template) stored in the rules engine 128. Utilizing the template 129 (e.g., initial template, original template) stored in the rules engine 128 and defining the initial source code (e.g., original source code, pre-customized source code) of the core computing system 106, the customization tracking system 102 may identify differences between the template 129 and the data retrieved by the customization tracking system 102. As noted above, an initial template corresponds to a respective core system's computing code prior to applying customizations, and the data retrieved by the customization tracking system 102 corresponds to the current source code 123 of the core computing system 106 computing code in which one or more customizations may have been applied. Accordingly, differences between the template 129 and the current source code 123 of the core computing system 106 may correspond to one or more customizations applied to a respective core computing system 106.

Figure 4:
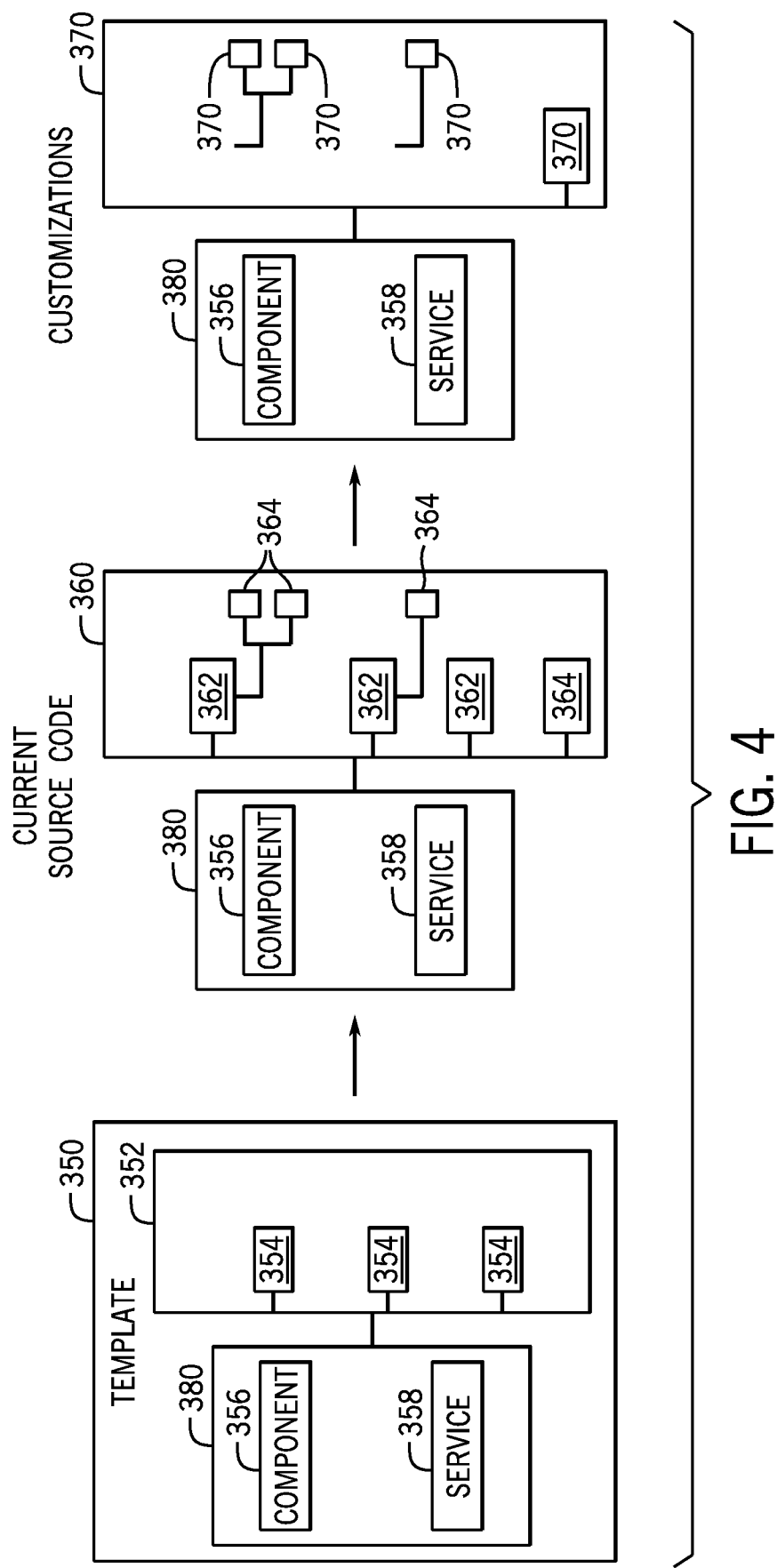
FIG. 4 illustrates a block diagram of an embodiment of a template and a current source code used to identify customizations applied to a core computing system, in accordance with embodiments described herein.

For example, FIG. 4 is a schematic block diagram of a template 350 and a current source code 360 that may be compared to identify customizations 370 applied to the current source code 360 of a core computing system 380.

The template 350 may correspond to the template 129 of FIG. 1 and the current source code 360 may correspond to the current source code 123 of FIG. 1. As illustrated in FIG. 4, the customization tracking system 102 may employ the template 350 defining an initial source code 352 of a core computing system 380 (e.g., core computing system 106). Similar to the discussion above with respect to the core source code 120 and the customized source code 122 of FIG. 1, the initial source code 352 may specify a listing of human-readable programming statements to be compiled or assembled into an executable computer program that further define the functions and services provided by the core computing system. Indeed, as noted above, before customizations are applied to a core computing system, the initial source code 352 and the current source code 360 may be the same. However, after an amount of time has passed, a representative of the organization (e.g., programmer) may modify the current source code 360, and thus, the differences between the initial source code 352 and the current source code 360 may be indicative of one or more customizations applied to the core computing system 380. The initial source code 352 may include respective portions 354 associated with one or more components 356 (e.g., attributes 112) of the core computing system 380 and/or respective portions 354 associated with one or more services 358 (e.g., mortgage loan fees service, credit card payment service, product and pricing service, etc.) provided by the core computing system 380.

The current source code 360 may also include respective portions 362 associated with the one or more components 356 of the core computing system 380 and/or respective portions 362 associated with the one or more services 358 provided by the core computing system 380. Further, the current source code 360 may include one or more additional portions 364 that correspond to one or more customizations applied to the core computing system 380. The one or more additional portions 364 may also be associated with the one or more components 356 of the core computing system 380 and/or the one or more services 380 provided by the core computing system 380. In some embodiments, the current source code 360 may correspond to the current source code 123 of FIG. 1. The current source code 360 may be periodically retrieved by the customization tracking system 102 to reflect the most recent source code used to operate and configure the core computing system 380, and thus may be associated with one or more customizations 370. As described above with respect to block 306 of FIG. 3, the customization tracking system 102 may compare the template 350 indicative of the initial source code 352 with the current source code 360, and differences between the template 350 and the current source code 360 may be indicative of the one or more customizations 370 applied to the core computing system 380.

Returning to FIG. 3, upon identifying the differences between the template 129 (e.g., initial template, original template, baseline template) and the current source code 123 of the core computing system 106 corresponding to one or more customizations applied to the core computing system 106, at block 308, the customization tracking system 102 may determine an amount of customization applied to the core computing system 106. That is, the customization tracking system 102 may quantify an amount of similarity or an amount of difference between the current source code 123 and the initial source code (e.g., defined in the template 129). For example, the customization tracking system 102 may determine that the amount of similarity between the current source code 123 and the initial source code of the core computing system 106 is 97%. Accordingly, the amount of difference between the current source code 123 and the initial source code is 3%, which corresponds to the amount of customization. In some embodiments, the customization tracking system 102 may determine a respective amount of customization associated with each of the one or more attributes 112 of the core computing system 106. That is, as described above, the current source code 123 (e.g., core source code 120 and customized source code 122 of FIG. 1) may have respective portions associated with each of the one or more attributes 112, and the customization tracking system 102 may quantify an amount of customization applied to each portion of the current source code 123 associated with each of the one or more attributes 112. In other embodiments, the customization tracking system 102 may determine a respective amount of customization associated with each of the services provided by the core computing system 106. Indeed, as noted above, the current source code 123 may also include respective portions associated with each of the services that the core computing system 106 provides. Thus, the customization tracking system 102 may quantify an amount of customization applied to each portion of the current source code 123 associated with each of the services provided by the core computing system 106.

At block 310, after determining the amount of customization applied to various aspects of the core computing system 106, the customization tracking system 102 may determine whether the amount of customization exceeds specified threshold values stored in the business logic model 126 of the customization tracking system 102. For example, as described above, the business logic model 126 of the customization tracking system 102 may include a number of thresholds provided by a vendor of the core computing system 106. The threshold values may be indicative of permissible amounts of customization for various aspects of the core computing system 106. That is, vendors may specify that the initial source code (or portions thereof associated with the attributes 112 or services provided by the core computing system 106) may be modified (e.g., customized) up to a prescribed amount before breaching certain compliance thresholds. For example, the business logic model 126 may include a first threshold value (e.g., less than 5%) specified by the vendor (e.g., from vendor data 107) that corresponds to an acceptable total amount of customization applied to core computing system 106 (i.e., sum of customization applied to the current source code of the core computing system 106). Further, in some embodiments, the business logic model 126 may include additional threshold values corresponding to acceptable amounts of customization for respective portions of the current source code 123 associated with the one or more attributes 112 of the core computing system 106 and/or respective portions of the current source code 123 associated with the services provided by the core computing system 106. As noted above, though a vendor may provide the prescribed threshold values, an authorized representative may include additional modified thresholds. In doing so, actions may be initiated to mitigate compliance risks prior to the amount of customization exceeding the prescribed threshold values provided by the vendor. For example, if a vendor has established a total customization threshold for the core computing system 106 at 5%, the representative may include a modified threshold at 4%, such that as the total amount of customization to the core computing system 106 approaches the modified threshold, a representative may be alerted of the increasing amount of customization and may initiate actions to limit or decrease customization before the amount of customization exceeds the specified threshold set by the vendor.

At block 312, the customization tracking system 102 may initiate an action based on the amount of customization exceeding specified threshold values (e.g., from a vendor) or modified threshold values (e.g., from an authorized representative) defined in the business logic model 126 of the customization tracking system 102. In some embodiments, the customization tracking system 102 may send a notification to a computing device associated with an authorized representative (e.g., Governance Team, compliance manager, developer, programmer) of the organization to notify the representative that the core computing system 106 is approaching customization limits (e.g., approaching compliance thresholds). The notification may automatically be displayed on the computing device associated with the representative via a text message, an email message, an alert, or the like. In some embodiments, the notification may be displayed despite the computing device being in a sleep or low power mode to increase the likelihood that the representative will take note of the notification. The notification may include a recommendation to stop customizing aspects of the core computing system, a recommendation to remove one or more applied customizations, and/or a recommendation to modify one or more of the applied customizations. In other embodiments, the notification may include a recommendation to request an update from the vendor. That is, upon identifying that the amount of customization to the core computing system 106 (or an aspect thereof) is approaching or breaching the threshold values stored in the business logic model 126, the representative of the organization may send a request to a vendor to integrate one or more of the identified customizations into an updated initial source code, as described in greater detail with respect to FIG. 5 below. Further, in some embodiments, a representative may be required to take action (e.g., reduce customization, request an update from vendor) to address the notification. That is, the notification may limit a representative from accessing the core computing system 106 until the representative adheres to the recommendations provided in the notification.

At block 314, the customization tracking system 102 may generate output associated with the one or more identified customizations. As noted above, the output generated by the customization tracking system 102 may include dashboards, visualizations, detailed metrics, and reports that provide summaries and statistics associated with the customizations. The detailed metrics and reports may provide specific details associated with the customizations including times of implementation, agents responsible for implementation, specific coding skills required for implementation, processing speeds associated with customized aspects of the core computing system 106, and the like. Indeed, the output generated by the customization tracking system 102 may provide insight on customized aspects of the core computing system 106, thereby enabling an organization to determine whether certain customizations should be removed (e.g., particular customization is slowing performance), whether specific programming skills are required to address an issue associated with the customization, and/or whether the core computing system 106 should be updated to incorporate portions of the customizations as core system computing code. In some embodiments, the output generated may enable the customization tracking system 102 to identify issues in the current source code 123 based on respective processing times associated with various portions of the current source code 123. That is, upon generating the output, the customization tracking system 102 may employ additional threshold values (e.g., stored in the business logic model 126) associated with respective processing times of the various portions of the current source code 123. Upon determining that a respective processing time associated with a respective portion of the code is above a threshold value (e.g., 3 seconds, 5 seconds) indicative of a delayed processing time, the customization tracking system 102 may flag the respective portion of the current source code 123 to indicate an issue in the current source code 123. By flagging the respective portion associated with the delayed processing time, the customization tracking system 102 and/or a representative of the organization may determine whether the issue in the current source code 123 is associated with the original (e.g., baseline) source code or with the one or more customizations that have been applied. In some embodiments, the output may include graphical representations of the customizations applied to the core computing system 106. Such graphical representations may be utilized by a representative (e.g., compliance manager, auditors, etc.) of the organization to dynamically monitor the amount of customization applied to the core computing system 106, such that compliance risks are mitigated, as discussed in greater detail with respect to FIG. 7.

Figure 5:
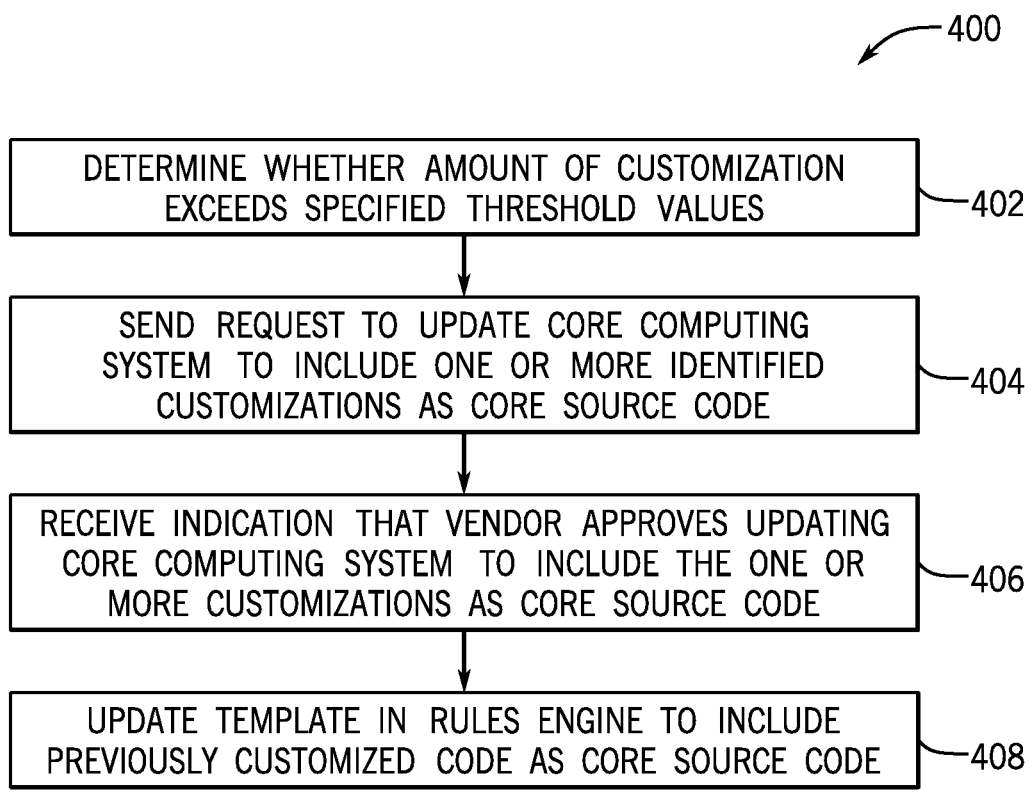
FIG. 5 illustrates a flow diagram of a method for updating a core system to incorporate one or more previously applied customizations, in accordance with embodiments described herein.

FIG. 5 illustrates a flow chart of a method 400 employed by the customization tracking system 102 for updating a core computing system 106 to incorporate one or more previously identified customizations into core system computing code. Although the following description of the method 400 is described in a particular order, it should be noted that the method 400 is not limited to the depicted order; and instead, the method 400 may be performed in any suitable order. In addition, although the customization tracking system 102 is described as performing the method 400, it should be understood that the method 400 may be performed by any suitable computing device.

Referring now to FIG. 5, at block 402, the customization tracking system 102 may determine whether an amount of customization applied to the core computing system 106 (or portions of the current source code 123 associated with the attributes 112 of the core computing system 106 and/or the services provided by the core computing system 106) is approaching and/or exceeds specified threshold values. Determining the amount of customization and whether the amount exceeds specified thresholds may be obtained via the method 300 described above with respect to FIG. 3. As described above, the specified threshold values may be established by the vendor or modified by a representative of the organization.

After determining that an amount of customization is exceeding specified threshold values, at block 404, the customization tracking system 102 may automatically send an indication to the vendor to update the initial source code of the core computing system 106 into an updated base source code that includes one or more of the customizations present in the current source code. That is, the updated base source code may correspond to a source code of the core computing system 106 that has been modified to include one or more of the previously applied customizations as base source code, such that the one or more previously applied customizations no longer correspond to customized aspects of the core computing system 106. For example, the indication may include a request to incorporate all of the identified customizations into the updated base source code of the core computing system 106, and/or a request to incorporate only a set of the identified customizations into the updated base source code. In some embodiments, a representative of the organization may generate the request to the vendor based on the output generated by the customization tracking system 102 indicating that the core computing system 106 is approaching compliance thresholds.

At block 406, the customization tracking system 102 may receive an indication that the vendor has approved one or more of the requests to update the initial source code into the updated base source code. That is, upon reviewing the request sent by the customization tracking system 102 or by a representative of the organization, the vendor may provide an indication of approval to incorporate one or more of the customizations into the updated base source code. The vendor may then provide the core computing system 106 with the updated base source code to customers.

At block 408, based on the approval from the vendor, the customization tracking system 102 or an authorized representative may update the template 129 in the rules engine 128 to correspond to the updated base source code. Subsequently, the customization tracking system 102 may perform the method 300 of FIG. 3 with the template 129 using the updated base source code to identify one or more customizations applied to the core computing system.

Figure 6:
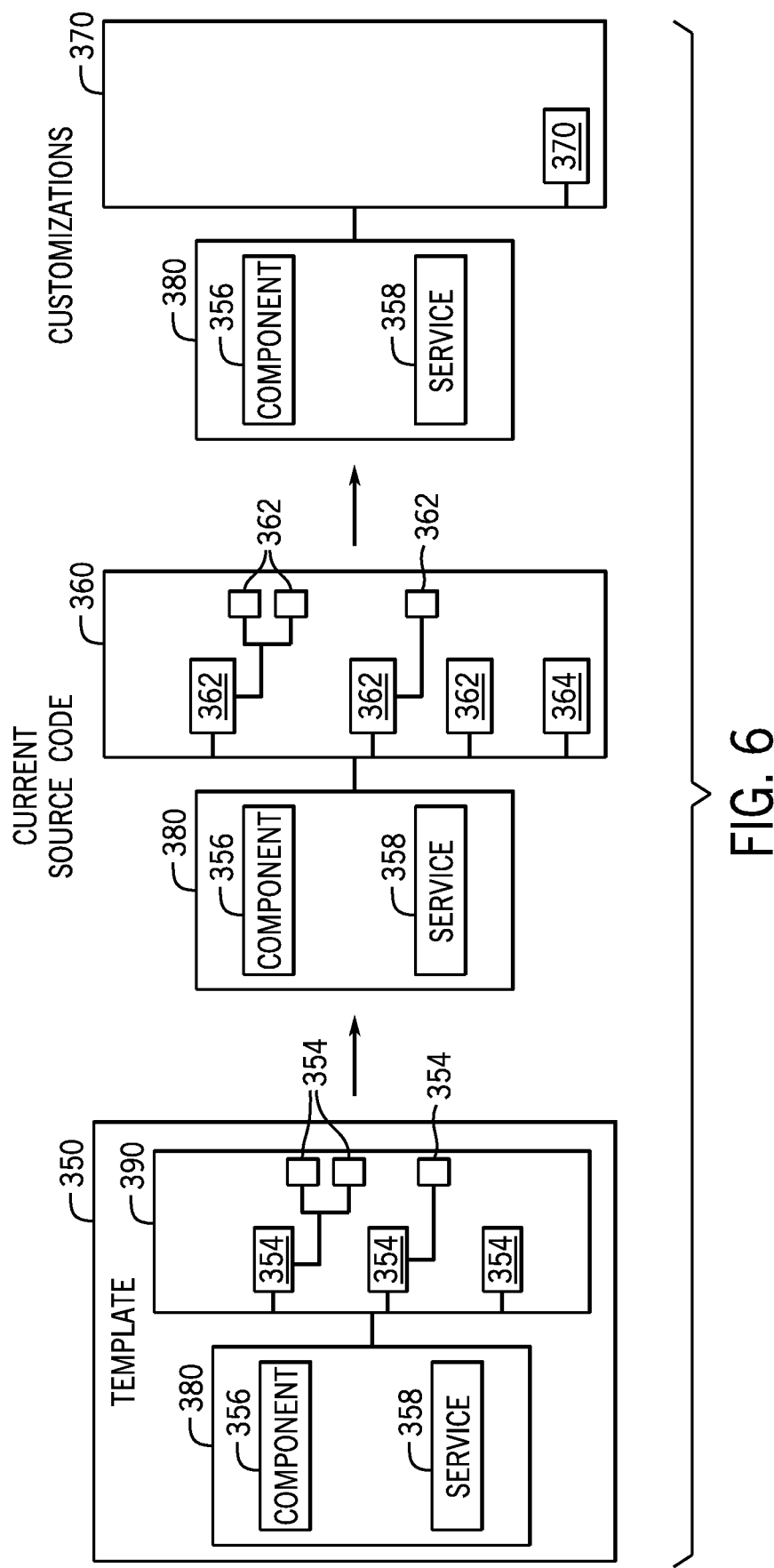
FIG. 6 illustrates a block diagram of an embodiments of an updated base source code and a current source code used to identify customization data associated with a core computing system, in accordance with embodiments described herein.

For example, FIG. 6 is a schematic block diagram of the template 350 with an updated base source code 390. As illustrated, the updated base source code 390 has replaced the initial source code 352 of FIG. 4. Further, the updated base source code 390 includes two modifications that do not appear in the initial source code 352 of FIG. 4. Each of the modifications may correspond to previously applied customizations (as shown in FIG. 4) that have now been incorporated into the updated base source code 390 of the core computing system 380. Accordingly, upon comparing the updated base source code 390 with the current source code 360, the customization tracking system 102 may identify fewer differences (i.e., customizations) because the updated base source code 390 has incorporated one or more of the previously identified customizations into core system computing code. It should be noted that upon comparing the updated base source code 390 with the current source code 360, differences between the two may correspond to applied customizations 370 that were not incorporated into the core system computing code and/or new customizations that have been added after generating the updated base source code 390.

Figure 7:
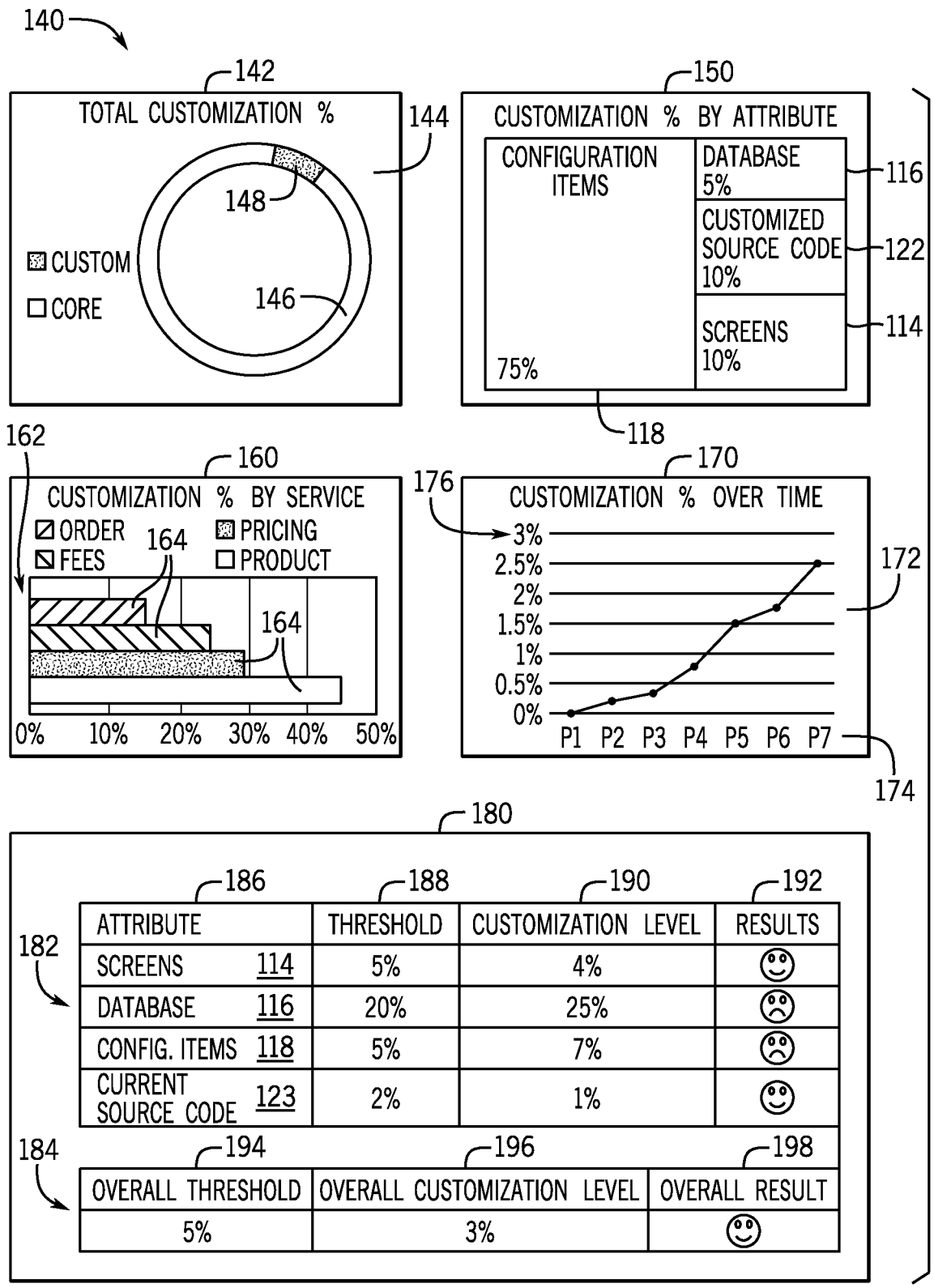
FIG. 7 illustrates an embodiment of one or more outputs provided by the customization tracking system of FIG. 1, in accordance with embodiments described herein.

FIG. 7 is a schematic view of various types of output 140 that may be generated by the customization tracking system 102, as described above. For example, as noted above, the customization tracking system 102 may generate one or more visual representations of the identified customizations applied to the core computing system 106. A first visualization 142 may provide information on a total amount of customization applied to the core computing system 106 via a pie chart 144. The pie chart 144 may have a first portion 146 corresponding to aspects of the current source code 123 that are same as the initial source code (or updated base source code) and a second portion 148 corresponding to aspects of the current source code 123 that are different from the initial source code (or updated base source code). The second portion 148 may correspond to the total amount of customization applied to the core computing system 106.

A second visualization 150 may provide information associated with an amount of customization applied to respective aspects (e.g., attributes 112) of the core computing system 106. For example, the second visualization 150 may display that out of the total amount of customization applied to the core computing system 106, the screens 114 are associated with 10% of the total customization, the databases 116 are associated with 5% of the total customization, the configuration items 118 are associated with 75% of the total customization, and the customized source code 122 is associated with 10% of the total customization.

A third visualization 160 may provide information associated with an amount of customization applied to respective portions of the current source code associated with the services provided by the core computing system 106. For example, the third visualization 160 may display a bar graph 162 having a plurality of bars 164, and each bar 164 may correspond to one or more services 166 provided by the core computing system. As illustrated, the third visualization 160 may provide information indicating that a respective portion of the current source code 123 associated with each service 166 has been customized a specified amount. Using such information, a representative of the organization may monitor whether certain services 166 provided by the core computing system 106 are experiencing an increased amount of customization which may hinder performance.

A fourth visualization 170 may provide information associated with an amount of customization applied to the core computing over a period of time. That is, the fourth visualization 170 may display a line graph 172 with a time 174 on the X-axis and an amount of customization 176 on the Y-axis. As illustrated, as time passes, the total amount of customization may increase.

A fifth visualization 180 may provide information regarding whether the identified customizations exceed or are within specified threshold values. For example, the fifth visualization 180 may include a first table 182 and a second table 184. The first table 182 may include an attribute column 186, a threshold column 188, a customization column 190, and a result column 192. The attribute column 186 may include each of the attributes 112 of the core computing system. The threshold column 188 may include the threshold values for the respective portions of the current source code 123 associated with each of the attributes 112 retrieved from the business logic model 126. The customization column 190 may correspond to the determined amount of customization applied to the respective portions of the current source code 123 associated with each the attributes 112, and the result column 192 may provide an indication of whether or not the amount of customization associated with each of the attributes 112 satisfies the threshold value.

The second table 184 may include an overall threshold column 194, an overall customization column 196, and an overall result column 198. The overall threshold column 194 may include the threshold value retrieved from the business logic model 126 for the total amount of customization applied to the core computing system 106. The overall customization column 196 may correspond to the determined total amount of customization applied to the core computing system 106, and the overall result column 198 may provide an indication of whether or not the total amount of customization satisfies the threshold value. As illustrated, the indication displayed in the result column 192 and/or the overall result column 198 may comprise a happy face when the amount of customization is within specified thresholds and a sad face when the amount of customization exceeds specified thresholds. In other embodiments, different indications may be used, including check marks and "X" marks, "Pass" and "Fail", "compliant" and "non-compliant," and the like.

Using the visualizations 142, 150, 160, 170, and 180 described above (in isolation or combination), a representative of the organization may be able to quickly retrieve important information regarding the customizations applied to the core computing system 106. Further, auditors may be provided the visualizations to facilitate determining whether the customizations are compliant with the vendor's specifications. Such visualizations may also provide insight on appropriate times to update the initial source code of the core computing system 106, which aspects of the core computing system 106 to customize, which aspects not to customize, and the like, thereby improving the performance, upgradability, and maintainability of the core computing system 106. It should be noted that the examples above are not intended to be limiting, and that the customization tracking system 102 may generate additional types of output that provide insight on customizations applied to the core computing system 106. Indeed, as noted above, the output generated may also include detailed metrics and reports that provide additional information associated with each of the applied customizations. For example, the detailed reports and/or metrics may provide processing times associated with various portions of the current source code. The processing times may be indicative of an efficiency of various portions of the current source code 123, and increased processing times may be indicative of decreased efficiency of certain portions of the current source code 123. Using the detailed metrics and reports, a representative of the organization, a vendor, or an auditor may be able to determine whether the increased processing times are associated with customized aspects of the core computing system 106. Upon determining that the increased processing times are associated with applied customizations, actions may be taken to increase the efficiency (e.g., remove customization) of the core computing system 106, as described above. However, upon determining that the increased processing times are not associated with the applied customizations, a representative of the organization may inform the vendor that unmodified aspects of the current source code 123 are causing processing delays, and may request an update to the initial source code of the core computing system 106. Similarly, the detailed metrics and reports may identify specific programming skills or languages associated with respective portions of the current source code 123 of the core computing system 106. Such information may be useful in determining which agent (e.g., programmer) to assign to address issues identified in the current source code 123. For example, upon determining that a portion of the code written in C++ is associated with increased processing times, the organization may dispatch an agent capable of writing computer code in C++ to address the increased processing times.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

While only certain features of disclosed embodiments have been illustrated and described herein, many modifications and changes will occur to those skilled in the art. It is then, therefore, to be understood that the appended claims are intended to cover all such modifications and changes as fall within the true spirit of the present disclosure.

The invention claimed is:

1. A system, comprising:
   a rules engine comprising a template indicative of an initial source code of a core computing system;
   a processor; and
   a memory storing instructions configured to cause the processor to:
   retrieve data associated with the core computing system by applying a data extract batch process that periodically queries the core computing system according to a data capture frequency value, wherein the data is indicative of a current source code for the core computing system;
   compare the data indicative of the current source code of the core computing system to the template indicative of the initial source code of the core computing system;
   identify one or more customizations in the current source code of the core computing system based on comparing the data to the template;
   quantify an amount of customization applied to the core computing system based on identifying the one or more customizations;
   determine that the amount of customization applied to the core computing system is approaching a threshold value indicative of a total desired amount of customization for the core computing system;
   modify the data extract batch process to periodically query the core computing system according to an increased data capture frequency value that is greater than the data capture frequency value based on the amount of customization approaching the threshold value; and
   send a request to a vendor associated with the core computing system to update the core computing system to include at least one of the one or more customizations into the initial source code based on the amount of customization approaching the threshold value.

2. The system of claim 1, wherein the core computing system comprises one or more attributes configured to enable the core computing system to provide one or more services to a client.

3. The system of claim 2, comprising a business logic model configured to define the threshold value as a first threshold value, and configured to define one or more additional threshold values indicative of a respective desired amount of customization for at least one of the one or more attributes of the core computing system.

4. The system of claim 3, wherein the instructions are configured to cause the processor to:
   determine that the amount of customization applied to a respective attribute of the one or more attributes is approaching a respective additional threshold value of the one or more additional threshold values indicative of the respective desired amount of customization for the respective attribute of the one or more attributes; and
   send the request to the vendor associated with the core computing system to update the core computing system to include one or more of the one or more customizations associated with the respective attribute into the initial source code based on the amount of customization approaching the respective additional threshold value.

5. The system of claim 3, wherein the instructions are configured to cause the processor to generate an alert in response to determining that the amount of customization exceeds the first threshold value, at least one of the one or more additional threshold values, or both.

6. The system of claim 5, wherein the alert includes a first recommendation to stop customizing the core computing system, a second recommendation to reduce the amount of customization applied to the core computing system, a third recommendation to modify one or more of the one or more customizations, or any combination thereof.

7. The system of claim 2, wherein the one or more attributes comprise one or more screens associated with the core computing system, one or more databases associated with the core computing system, one or more configuration items associated with the core computing system, core source code associated with the core computing system, customized source code associated with the core computing system, or any combination thereof.

8. The system of claim 1, wherein the instructions are configured to cause the processor to generate output associated with the current source code, wherein the output comprises one or more visualizations indicative of the one or more customizations.

9. The system of claim 1, wherein the instructions are configured to cause the processor to:
  generate output indicative of a plurality of processing times associated with one or more portions of the current source code;
  identify an issue in at least one portion of the one or more portions of the current source code based on a respective processing time associated with the at least one portion exceeding an additional threshold value indicative of an acceptable processing time associated with the at least one portion of the current source code; and
  determine whether the issue in the at least one portion of the current source code is associated with the one or more customizations.

10. The system of claim 1, wherein the total desired amount of customization for the core computing system corresponds to a maximum acceptable amount of customization for the core computing system.

11. The system of claim 10, wherein the instructions are configured to cause the processor to initiate an action to limit the amount of customization applied to the core computing system based on the amount of customization approaching the maximum acceptable amount of customization.

12. The system of claim 11, wherein the action comprises sending a notification to a computing device associated with an authorized representative of the core computing system, wherein the notification includes an indication that the amount of customization is approaching the maximum acceptable amount of customization.

13. A non-transitory, computer-readable medium comprising computer-executable instructions configured to, when executed, cause a processor to:
  retrieve data associated with a core computing system by applying a data extract batch process that periodically queries the core computing system according to a data capture frequency value, wherein the data corresponds to a current source code for the core computing system, and wherein the core computing system comprises one or more attributes configured to enable the core computing system to provide one or more services to a client;
  retrieve a template from a rules engine, wherein the template corresponds to an initial source code of the core computing system;
  compare the data corresponding to the current source code of the core computing system to the template corresponding to the initial source code of the core computing system;
  identify one or more customizations applied to the current source code of the core computing system based on one or more differences between the data and the template, wherein the one or more differences correspond to the one or more customizations;
  quantify an amount of customization applied to the core computing system based on identifying the one or more customizations;
  determine that the amount of customization applied to the core computing system is approaching a threshold value indicative of a total desired amount of customization for the core computing system;
  modify the data extract batch process to periodically query the core computing system according to an increased data capture frequency value that is greater than the data capture frequency value based on the amount of customization approaching the threshold value; and
  send a request to a vendor associated with the core computing system to update the core computing system to include at least one of the one or more customizations into the initial source code based on the amount of customization approaching the threshold value.

14. The non-transitory, computer-readable medium of claim 13, wherein the threshold value is a first threshold value, and wherein the instructions are configured to cause the processor to retrieve, from a business logic model, the first threshold value and one or more additional threshold values indicative of a respective desired amount of customization for at least one of the one or more attributes of the core computing system.

15. The non-transitory, computer-readable medium of claim 14, wherein the instructions are configured to cause the processor to:
  determine that the amount of customization applied to a respective attribute of the one or more attributes is approaching a respective additional threshold value of the one or more additional threshold values indicative of the respective desired amount of customization for the respective attribute of the one or more attributes; and
  send the request to the vendor associated with the core computing system to update the core computing system to include one or more of the one or more customizations associated with the respective attribute into the initial source code based on the amount of customization approaching the respective additional threshold value.

16. The non-transitory, computer-readable medium of claim 13, wherein the instructions are configured to cause the processor to:
  generate output indicative of a plurality of processing times associated with one or more portions of the current source code;
  identify an issue in at least one portion of the one or more portions of the current source code based on a respective processing time associated with the at least one portion being less than an additional threshold value indicative of an acceptable processing time associated with the at least one portion of the current source code; and determine whether the issue in the at least one portion of the current source code is associated with the one or more customizations.

17. A method, comprising:
retrieving, via a processor, data associated with a core computing system by applying a data extract batch process that periodically queries the core computing system according to a data capture frequency value, wherein the data is indicative of a current source code of the core computing system;
retrieving, via the processor, a template from a rules engine, wherein the template is indicative of an initial source code of the core computing system;
comparing, via the processor, the data indicative of the current source code of the core computing system to the template indicative of the initial source code of the core computing system;
identifying, via the processor, one or more customizations applied to the core computing system based on one or more differences between the data and the template, wherein the one or more differences correspond to the one or more customizations;
determining, via the processor, that an amount of customization applied to the core computing system is approaching a first threshold value indicative of a total desired amount of customization for the core computing system;
modifying, via the processor, the data extract batch process to query the core computing system at an increased data capture frequency value that is higher than the data capture frequency value based on the amount of customization approaching the first threshold value; and
sending, via the processor, a request to a vendor associated with the core computing system to update the core computing system to include at least one of the one or more customizations into the initial source code based on the amount of customization approaching the first threshold value.

18. The method of claim 17, comprising quantifying, via the processor, the amount of customization applied to the core computing system based on identifying the one or more customizations.

19. The method of claim 17, wherein the core computing system comprises one or more attributes configured to enable the core computing system to provide one or more services to a client, the method comprising:
retrieving, via the processor, one or more additional threshold values indicative of a respective desired amount of customization for at least one of the one or more attributes of the core computing system;
determining, via the processor, the amount of customization applied to a respective attribute of the one or more attributes is approaching a respective additional threshold value of the one or more additional threshold values indicative of the respective desired amount of customization for the respective attribute of the one or more attributes; and
sending, via the processor, the request to the vendor associated with the core computing system to update the core computing system to include one or more of the one or more customizations associated with the respective attribute into the initial source code based on the amount of customization approaching the respective additional threshold value.

20. The method of claim 17, comprising:
generating, via the processor, output indicative of a plurality of processing times associated with a plurality of portions of the current source code;
identifying, via the processor, an issue in at least one portion of the plurality of portions of the current source code based on a respective processing time associated with the at least one portion exceeding a second threshold value indicative of an acceptable processing time associated with the at least one portion of the current source code; and
determining, via the processor, whether the issue in the at least one portion of the current source code is associated with the one or more customizations.

* * * * *